(12) United States Patent
Putzig et al.

(10) Patent No.: US 7,732,384 B2
(45) Date of Patent: Jun. 8, 2010

(54) SOLID BOROZIRCONATE AND BOROTITANATE CROSS-LINKERS

(75) Inventors: Donald Edward Putzig, Newark, DE (US); Peter Jernakoff, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 286 days.

(21) Appl. No.: 12/004,727

(22) Filed: Dec. 21, 2007

(65) Prior Publication Data

US 2009/0159280 A1 Jun. 25, 2009

(51) Int. Cl.
*C01B 35/04* (2006.01)
*C01G 23/00* (2006.01)
*C01G 25/00* (2006.01)
*C09K 8/60* (2006.01)
*E21B 33/13* (2006.01)
*E21B 43/26* (2006.01)

(52) U.S. Cl. ............... 507/271; 166/285; 166/292; 166/295; 166/308.5; 423/69; 423/297; 507/211; 507/214; 507/273

(58) Field of Classification Search .......... 507/271, 507/273, 211, 214; 423/69, 297; 166/285, 166/292, 295, 308.5

See application file for complete search history.

(56) References Cited

U.S. PATENT DOCUMENTS

| 2,991,299 | A |   | 7/1961  | Omietanski |           |
|-----------|---|---|---------|------------|-----------|
| 4,514,309 | A |   | 4/1985  | Wadhwa     |           |
| 4,683,068 | A | * | 7/1987  | Kucera     | 507/201   |
| 4,692,254 | A | * | 9/1987  | Kucera     | 507/244   |
| 5,106,518 | A |   | 4/1992  | Cooney et al. |        |
| 5,165,479 | A |   | 11/1992 | Harris et al. |        |
| 5,217,632 | A |   | 6/1993  | Sharif     |           |
| 5,806,597 | A |   | 9/1998  | Tjon-Joe-Pin et al. |  |
| 6,214,773 | B1|   | 4/2001  | Harris et al. |        |
| 6,310,008 | B1|   | 10/2001 | Rietjens   |           |
| 7,165,617 | B2|   | 1/2007  | Lord et al. |          |
| 2004/0163813 | A1 |   | 8/2004 | Slabaugh et al. |    |
| 2006/0058198 | A1 |   | 3/2006 | Dessinges et al. |   |
| 2008/0149333 | A1 | * | 6/2008 | Putzig | 166/280.2 |
| 2008/0287325 | A1 | * | 11/2008| Thompson et al. | 507/273 |
| 2009/0131282 | A1 | * | 5/2009 | Putzig | 507/219 |
| 2009/0131284 | A1 | * | 5/2009 | Putzig | 507/244 |
| 2009/0149355 | A1 | * | 6/2009 | Putzig | 507/240 |
| 2009/0151945 | A1 | * | 6/2009 | Putzig | 166/280.2 |
| 2009/0151946 | A1 | * | 6/2009 | Putzig | 166/280.2 |
| 2009/0151947 | A1 | * | 6/2009 | Putzig | 166/280.2 |
| 2009/0156434 | A1 | * | 6/2009 | Putzig | 507/240 |
| 2009/0166041 | A1 | * | 7/2009 | Putzig | 166/281 |

FOREIGN PATENT DOCUMENTS

| JP | 2002265672 A | 9/2002 |
| JP | 2004066203 A | 3/2004 |
| JP | 2005247891 A | 9/2005 |

OTHER PUBLICATIONS

Al-Anazi et al., Optimization of borate-based gels used for wellbore diversion during well stimulation: A case study; Proceedings—SPE/DOE Symposium on Improved Oil Recovery, 11$^{th}$, Tulsa, Oklahoma, Apr. 19-22, 1998, vol. 2, 449-462; Publisher: Society of Petroleum Engineers, Richardson, Texas, USA, Abstract.

* cited by examiner

*Primary Examiner*—Timothy J. Kugel
(74) *Attorney, Agent, or Firm*—Kathryn M. Sanchez

(57) ABSTRACT

A process is provided to prepare solid borozirconate and solid borotitanate cross-linkers, which comprises contacting zirconium or titanium complex with alkanolamine at particular mole ratios of boron, zirconium or titanium and alkanolamine. Use of the cross-linkers in compositions for oil field applications such as hydraulic fracturing and plugging of permeable zones are also disclosed.

21 Claims, No Drawings

SOLID BOROZIRCONATE AND BOROTITANATE CROSS-LINKERS

FIELD OF THE INVENTION

The present invention relates to solid borozirconate and borotitanate compositions and their use in oil field applications such as hydraulic fracturing and plugging of permeable zones.

BACKGROUND OF THE INVENTION

The production of oil and natural gas from an underground well (subterranean formation) can be stimulated by a technique called hydraulic fracturing, in which a viscous fluid composition (fracturing fluid) containing a suspended proppant (e.g., sand, bauxite) is introduced into an oil or gas well via a conduit, such as tubing or casing, at a flow rate and a pressure which create, reopen and/or extend a fracture into the oil- or gas-containing formation. The proppant is carried into the fracture by the fluid composition and prevents closure of the formation after pressure is released. Leak-off of the fluid composition into the formation is limited by the fluid viscosity of the composition. Fluid viscosity also permits suspension of the proppant in the composition during the fracturing operation. Cross-linkers, such as borates, titanates or zirconates, are usually incorporated into the fluid composition to control viscosity.

Typically, less than one third of available oil is extracted from a well after it has been fractured before production rates decrease to a point at which recovery becomes uneconomical. Enhanced recovery of oil from such subterranean formations frequently involves attempting to displace the remaining crude oil with a driving fluid, e.g., gas, water, brine, steam, polymer solution, foam, or micellar solution. Ideally, such techniques (commonly called flooding techniques) provide a bank of oil of substantial depth being driven into a producing well; however, in practice this is frequently not the case. Oil-bearing strata are usually heterogeneous, some parts of them being more permeable than others. As a consequence, channeling frequently occurs, so that the driving fluid flows preferentially through permeable zones depleted of oil (so-called "thief zones") rather than through those parts of the strata which contain sufficient oil to make oil-recovery operations profitable.

Difficulties in oil recovery due to thief zones may be corrected by injecting an aqueous solution of an organic polymer and a cross-linker into a subterranean formation under conditions where the polymer will be cross-linked to produce a gel, thus reducing permeability of the subterranean formation to the driving fluid (gas, water, etc.). Polysaccharide- or partially hydrolyzed polyacrylamide-based fluids cross-linked with certain aluminum, titanium, zirconium, and boron based compounds are used in these enhanced oil recovery applications. Cross-linked fluids or gels, whether for fracturing a subterranean formation or for reducing permeability of zones in subterranean formation, are now being used in hotter and deeper wells under a variety of temperature and pH conditions. In these operations the rate of cross-linking is critical to the successful generation of viscosity.

Boron compounds are typically used as cross-linkers in fracturing fluids used in low to mid temperature wells (150-250° F., 66-121° C.). A pH of 10 or greater is required. Cross-linking takes place immediately on mixing of boron compound with polymer base gel. Boron-cross-linked gels are not shear sensitive.

Existing delayed zirconium-based cross-linkers, based on triethanolamine or hydroxyalkylated ethylenediamine have been designed to initiate cross-linking in the wellbore. Therefore, they are ineffective at generating viscosity under mild surface temperature conditions. The gels are also shear sensitive and require higher horsepower (energy consumption) to pump.

The need exists in some fracturing fluid applications to generate an initial viscosity at the surface, followed by a delayed viscosity generation, once the fluid is subjected to higher down-hole temperatures. Current technology involves using a borate ion generating material in combination with a delayed zirconate cross-linker to accomplish both surface and delayed viscosity development. However, borate/zirconate cross-linking compositions suffer from disadvantages, such as, poor shelf stability, insufficient viscosity generation and undesirable cross-linking rates.

Most existing cross-linkers, including borate-based cross-linkers are liquid products which either freeze or become too viscous to pump under cold outdoor conditions such as found in Canada or the Rocky Mountains. There is a need for solid cross-linkers which can be used to generate high, thermally stable viscosity in a low and/or high pH environment. Such solid cross-linkers could be pre-blended with polymer, added as a solid to the aqueous polymer solution or dissolved in water and added to the aqueous polymer solution.

The need also exists for solid cross-linkers in off-shore fracturing operations, where the weight of chemicals being shipped and stored is critical. Solid cross-linkers which could contain two or more times the active metal (e.g., Zr or Ti) content of the liquid counterparts, would allow fracturing operations to be completed in a more economical fashion.

Still another need is for solid cross-linkers which are non-flammable. Many existing liquid borate, zirconate or titanate cross-linkers are flammable liquids.

U.S. Patent Application No. 2006/0058198 discloses a fluid additive comprising a cross-linker and a delay agent, wherein the cross-linker and delay agent such as sodium gluconate are combined in dry form in the field. The cross-linker may be a boron compound, a titanate, a zirconate, or a mixture thereof. In the field, the dry mixing can result in hour-to-hour or day-to-day variations due to weighing errors, incomplete mixing, or differing rates of solution.

Thus, there remain needs for solid borozirconate and borotitanate cross-linkers which are capable of generating excellent viscosity in the desired 3-5 minute range, and can be used in cold climates and off-shore applications.

SUMMARY OF THE INVENTION

The present invention provides a process to prepare a solid borometalate complex, which is suitable for use in a cross-linking composition used as a fracturing fluid, wherein the metalate is zirconate or titanate. The process comprises: (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker. In step (d), the volatiles are preferably removed by evaporation, for example, on a rotary evaporator. The temperature for evaporation should be below the melting or softening point of the borometalate cross-linker, preferably between 50° C. and 80° C. Surprisingly, the process of this invention provides a product which is a solid cross-linker rather than a product which is an intractable oil or a viscous gum as frequently occurs upon removal of solvent from a solution of a zirconium or titanium cross-linker.

The present invention further provides a cross-linking composition comprising the solution of the borozirconate complex prepared according to the process of this invention and a method to use the cross-linking composition as a fracturing fluid.

DETAILED DESCRIPTION OF THE INVENTION

Trademarks and Tradenames are shown herein in upper case.

This invention provides solid borozirconate-alkanolamine and borotitanate-alkanolamine complexes which provide effective cross-linkers for use in high pH oil field applications. These complexes are provided by a method comprising: (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker. It has been surprisingly found that a solid, preferably a granular solid, can be prepared by the process described herein in which ratios of ligand to boron and metal are controlled. Optionally, a diluent is added to the product of step (c) or to the solid produced in step (d). The diluent is added to act as an anti-caking agent or to aid flowability of the solid.

The precise structure of the solid borozirconate-alkanolamine or borotitanate-alkanolamine complexes is not known. The products produced in the process of this invention may consist of separate and/or combined borate and zirconate complexes with the alkanolamine, or of separate and/or combined borate and titanate complexes with the alkanolamine.

In step (a), an alcoholic solution of a zirconium or titanium complex is contacted with an alkanolamine. The zirconium or titanium complex may be provided as a solution of a tetraalkyl zirconate or tetraalkyl titanate in an alcohol having 1 to 6 carbon atoms. The mole ratio of alkanolamine to zirconium or titanium is from 0.8 to 2.2 moles of an alkanolamine per mole of zirconium or titanium. Preferably this ratio is from 1 to 2 moles of alkanolamine per mole of zirconium or titanium.

A number of tetraalkyl zirconates (also known as zirconium tetraalkoxides) can be used to prepare the above zirconium complex, e.g., tetra-isopropyl zirconate, tetra-n-propyl zirconate, and tetra-n-butyl zirconate. The preferred tetraalkyl zirconate is tetra-n-propyl zirconate, available as TYZOR NPZ organic zirconate, a solution in n-propanol with a zirconium content as $ZrO_2$ of about 28% by weight, and available from E.I. du Pont de Nemours and Company, Wilmington, Del.

A number of tetraalkyl titanates (also known as titanium tetraalkoxides) can be used to prepare the above titanium complex, e.g., tetra-isopropyl titanate, tetra-n-propyl titanate, and tetra-n-butyl titanate. The preferred tetraalkyl titanate is tetra-isopropyl titanate, available as TYZOR TPT organic titanate, a solution in isopropanol with a titanium content as $TiO_2$ of about 28% by weight, and available from E.I. du Pont de Nemours and Company, Wilmington, Del.

Examples of suitable alkanolamines include, but are not limited to, trialkanolamines, hydroxyalkylene diamines, and mixtures thereof. Preferably, the trialkanolamine is selected from the group consisting of triethanolamine, tri-n-propanolamine and tri-isopropanolamine. More preferably, the alkanolamine is triethanolamine. Preferably the hydroxyalkylenediamine is tetrahydroxyisopropyl ethylenediamine or hydroxyethyl trishydroxyisopropyl ethylenediamine. More preferably it is tetrahydroxyisopropyl ethylenediamine, which is available as QUADROL polyol from BASF Corporation, Mount Olive, N.J.

The alcohol solvent may be methanol, isopropanol, n-propanol or other alcohol having 1 to 6 carbon atoms. Preferably the alcohol is methanol, isopropanol, or n-propanol.

Contacting the above tetraalkyl zirconates or tetraalkyl titanates with the alkanolamine can be carried out at a variety of temperatures, e.g., between 25° C. and 90° C., preferably between 50° C. and 80° C., and in any order. The mixture is then held at this temperature for a sufficient period to reach equilibrium. A contact time of about 2 hours at 60° C. is adequate, but other periods may be used.

In step (b) the composition resulting from step (a) is then contacted with a boron compound at a temperature between 25° C. and 90° C., preferably between 50° C. and 80° C., to form a borozirconate or borotitanate complex. The boron compound is added in an amount to provide about 0.25 to 3 moles of boron per mole of zirconium or titanium. The boron compound may be added as a solid or dissolved in an alcohol or other solvent. Preferably, when the boron compound is dissolved or slurried, the same alcohol is used in step (a), for ease of recovery.

The boron compound is preferably boric acid or a trialkyl borate. The preferred trialkyl borate is triisopropyl borate.

In step (c), the solution or slurry resulting from step (b) is maintained at the reaction temperature for a period of time sufficient to establish equilibrium. By equilibrium, it is meant the reaction has gone to completion. A time of about 1-3 hours at 60° C. is adequate for reaction to reach completion, but other periods of time may be used, as can be easily determined by one skilled in the art.

In step (d), the volatiles are removed from the equilibrium composition produced in step (c), for example by distilling under vacuum. Preferably, distillation is carried out in a rotary evaporator, graining bowl, or other vacuum device with rotating parts to keep the solid in motion as it solidifies to limit and/or prevent lump formation. Spray drying may also be used in step (d) to remove the volatiles. Many types of suitable equipment may be used, as are well known to those skilled in the art. The temperature of drying should be below the melting or softening point of the borozirconate or borotitanate complex. Preferably the temperature is between 50° C. and 80° C.

Optionally and preferably, a diluent is added to the product of step (c) or to the solid produced in step (d). The diluent can be any material which may enhance properties of the solid, and does not adversely affect the solid or its use as a crosslinking agent. A diluent is added for such purposes as to help in the crystallization step, increase the crystallinity of the solid particles, provide an anti-caking action, improve the flowability of the solid material, enable easier solution of the solids in water, improve product stability, or for other purposes.

For example, the diluent may be a salt or metal oxide. The diluent may be selected from the group consisting of potassium chloride, tetramethylammonium hydroxide, titanium dioxide and silicon dioxide. Potassium chloride and tetramethylammonium hydroxide, for example, make the solid easier to remove from the drying unit than undiluted solids. The resulting solids are also more free-flowing and hence much more easily handled in the field. Insoluble inert compounds such as titanium dioxide and silicon dioxide may also be used to improve handling, and may be added before or after the drying step (d).

The present invention also provides a cross-linking composition which comprises: (A) an aqueous liquid; (B) a pH buffer; (C) a cross-linkable organic polymer; and (D) a solid borozirconate or borotitanate complex, prepared according to a process comprising (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker. If desired, prior to use, the particle size of the solid (D) may be modified by grinding or other means to modify the cross-linking speed. Optionally, the solid borozirconate or borotitanate complex (D) is contacted with a solvent such as water or an alcohol, prior to use in a cross-linking composition. The preferred solvent is water.

The aqueous liquid (A) is typically selected from the group consisting of water, aqueous alcohol, and aqueous solution of a clay stabilizer. The alcohol can be the same or different alcohol as the reaction solvent, that is, an alcohol having 1 to 6 carbon atoms. Preferably, when the aqueous liquid is aqueous alcohol, the alcohol is methanol or ethanol. Clay stabilizers include, for example, hydrochloric acid and chloride salts, such as, tetramethylammonium chloride (TMAC) or potassium chloride. Aqueous solutions comprising clay stabilizers may comprise, for example, 0.05 to 0.5 weight % of the stabilizer, based on the combined weight of the aqueous liquid and the organic polymer (i.e., the base gel). Preferably, when the aqueous liquid is an aqueous solution of a clay stabilizer, the clay stabilizer is tetramethylammonium chloride or potassium chloride.

The aqueous liquid can also be a mixture of water and one or more organic solvents. Organic solvents that may be used include alcohols, glycols, polyols, and hydrocarbons such as diesel.

Preferably, the aqueous liquid is water, aqueous methanol, aqueous ethanol, an aqueous solution of potassium chloride, an aqueous solution of tetramethylammonium chloride, or a combination of two or more thereof.

The cross-linking composition comprises an effective amount of a pH buffer (B) to control pH. The pH buffer may be acidic, neutral or basic. The pH buffer is generally capable of controlling the pH from about pH 5 to about pH 12. For example in a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. Other suitable pH buffers can be used, as are known to those skilled in the art.

The composition further comprises a cross-linkable organic polymer (C). Suitable cross-linkable organic polymers are selected from the group consisting of solvatable polysaccharides, polyacrylamides and polymethacrylamides. Preferably the organic polymer is a solvatable polysaccharide and is selected from the group consisting of gums, gum derivatives and cellulose derivatives. Gums include guar gum and locust bean gum, as well as other galactomannan and glucomannan gums, such as those derived from sennas, Brazilwood, tera, honey locust, karaya gum and the like. Preferred gum derivatives include hydroxyethylguar (HEG), hydroxypropylguar (HPG), carboxyethylhydroxyethylguar (CEHEG), carboxymethylhydroxypropylguar (CMHPG), and carboxymethyl guar (CMG). Preferred cellulose derivatives include those containing carboxyl groups, such as carboxymethylcellulose (CMC) and carboxymethylhydroxyethylcellulose (CMHEC). The solvatable polysaccharides can be used individually or in combination; usually, however, a single material is used. Guar derivatives and cellulose derivatives are preferred, such as, HPG, CMC and CMHPG. HPG is generally more preferred based upon its commercial availability and desirable properties. However, CMC and CMHPG may be more preferred in cross-linking compositions when the pH of the composition is less than 6.0 or higher than 9.0, or when the permeability of the formation is such that one wishes to keep the residual solids at a low level to prevent damage to the formation. The cross-linkable polymer is normally mixed with the aqueous liquid to form a base gel.

The solid borozirconate or borotitanate complex (D) is made by a process comprising: (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker.

Optionally, (D) may be used as a solution, wherein the solution is prepared by contacting the above solid borozirconate or borotitanate complex with sufficient water or other solvent, preferably, water to dissolve the complex. If desired, prior to use, the particle size of the solid (D) may be modified by grinding or other means to modify the cross-linking speed, or to facilitate dissolving in water or solvent.

The solid cross-linker (D) can be pre-blended with the solid polymer prior to dissolving both the solid cross-linker and solid polymer in the aqueous liquid (A). Alternatively, the solid cross-linker can be added to the aqueous liquid (A) as a solid or in solution, before or after addition of the polymer (C). Typically, the cross-linkable polymer (C) is mixed with the aqueous liquid (A) such as water or mixed water/organic solvent or with an aqueous solution to form a base gel prior to adding the zirconium cross-linking agent. Organic solvents that may be used include alcohols, glycols, polyols, and hydrocarbons such as diesel.

The cross-linking composition may comprise optional components, including those which are common additives for oil field applications. Thus, the composition may further comprise one or more of proppants, friction reducers, bactericides, hydrocarbons, chemical breakers, polymer stabilizers, surfactants, formation control agents, and the like. Proppants include sand, bauxite, glass beads, nylon pellets, aluminum pellets and similar materials. Friction reducers include polyacrylamides. Hydrocarbons include diesel oil. Chemical breakers break the cross-linked polymer (gel) in a controlled manner and include enzymes, alkali metal persulfate, and ammonium persulfate. Polymer stabilizers include methanol, alkali metal thiosulfate, and ammonium thiosulfate.

These optional components are added in an effective amount sufficient to achieve the desired cross-linking performance based on the individual components, desired crosslinking time, temperature and other conditions present in the formation being fractured or permeable zone being plugged.

The cross-linking composition is produced by mixing the solid or solution of borozirconate or borotitanate complex with the other components, in any order. For example, in one particular application in an oil field, the solution of borozirconate or borotitanate complex and optional components are introduced into a formation, while the cross-linkable organic polymer and aqueous liquid are introduced into the formation as a separate stream. Alternatively, all components may be premixed and introduced into a subterranean formation as a single stream. Advantageously, the components may be mixed in different combinations, and more advantageously, the components may be mixed just prior to use to enable easy variation and adjustment of the cross-linking rate.

This invention also provides a method for hydraulically fracturing a subterranean formation, which comprises introducing into the formation at a flow rate and pressure sufficient to create, reopen, and/or extend one or more fractures in the formation, a cross-linking composition comprising: (A) an aqueous liquid; (B) a pH buffer; (C) a cross-linkable organic polymer; and (D) a solid borozirconate or borotitanate complex, prepared by a process comprising: (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker. If desired, the particle size of the solid may be modified by grinding or other means before the addition, for example, to modify the cross-linking speed. Optionally, (D) may be a solution made by a process comprising contacting the above solid borozirconate or borotitanate complex with water or other solvent, preferably with water.

In one embodiment of the method for hydraulically fracturing a subterranean formation, the solid borozirconate or borotitanate complex, the cross-linkable polymer and an aqueous liquid are contacted prior to their introduction into the formation, such that the cross-linker and polymer react to form a cross-linked gel. The cross-linked gel is then introduced into the formation at a flow rate and pressure sufficient to create, reopen, and/or extend a fracture in the formation.

In this method, a base gel is prepared by mixing a cross-linkable organic polymer with an aqueous liquid. A cross-linked gel composition is prepared by mixing the base gel with the solid borozirconate or borotitanate complex described previously, and optionally a solvent, the solid being made by a method comprising: (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker. At least one of the solid borozirconate or borotitanate complex or solution of the complex, the base gel, or further comprise a pH buffer (B).

Alternatively, the subterranean formation may be penetrated by a wellbore, such that the method comprises dissolving the borozirconate or borotitanate complex in a solvent, contacting the solution of borozirconate or borotitanate complex with the base gel in the wellbore and introducing the cross-linked gel into the formation from the wellbore. This method of hydraulically fracturing a subterranean formation penetrated by a wellbore comprises (1) preparing a base gel by mixing a cross-linkable organic polymer with an aqueous liquid; (2) introducing the base gel into the wellbore; (3) simultaneously with, or sequentially after, introducing the base gel into the wellbore, introducing a solution of a solid borozirconate or borotitanate complex wherein the solution is prepared by a process comprising: contacting a solution of a zirconium or titanium complex in an alcohol with an alkanolamine; contacting the zirconium/alkanolamine or titanium/alkanolamine product with a boron compound and completing the reaction; removing the volatiles from the solution to form a solid borozirconate or borotitanate complex; and dissolving the solid borozirconate or borotitanate complex in methanol or water; (4) permitting the base gel and the solution of borozirconate or borotitanate complex to react to form a cross-linked aqueous gel; and (5) introducing the cross-linked gel into the formation from the wellbore at a flow rate and pressure sufficient to create, reopen, and/or extend a fracture in the formation. A pH buffer is independently admixed with the base gel, the solid or solution of borozirconate or borotitanate complex, or both the gel and complex, prior to introducing the base gel and the borozirconate or borotitanate solution into the wellbore.

Upon creation of a fracture or fractures, the method may further comprise introducing a cross-linking composition comprising the solution of borozirconate or borotitanate complex, prepared by dissolving the solid complex in water or a solvent, a cross-linkable organic polymer and proppant into the fracture or fractures. This second introduction of a solution of borozirconate or borotitanate complex is preferably performed in the event the cross-linking composition used to create the fracture or fractures did not comprise proppant.

Another use for the borozirconate or borotitanate complex of the present invention relates to a method for selectively plugging permeable zones and leaks in subterranean formations which comprises introducing into the permeable zone or the site of the subterranean leak, a cross-linking composition comprising (A) an aqueous liquid; (B) a pH buffer; (C) a cross-linkable organic polymer; and D) a solid borozirconate or borotitanate complex prepared by a process comprising (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker. If desired, the particle size of the solid may be modified by grinding or other means before the addition so as to modify the cross-linking speed. Optionally, (D) is a solution made by a process comprising contacting a solid borozirconate or borotitanate complex prepared as described above with water or other solvent, preferably with methanol or water. The pH buffer may be admixed with the solid or solution of borozirconate or borotitanate complex prior to introducing the cross-linking composition into the permeable zone or site of the leak.

In a first embodiment of the method for plugging a permeable zone or a leak in a subterranean formation, the aqueous liquid, pH buffer, cross-linkable organic polymer and the solid or solution of borozirconate or borotitanate complex are contacted prior to their introduction into the subterranean formation, such that the polymer and borozirconate or borotitanate complex react to form a cross-linked aqueous gel, which gel is then introduced into the formation.

In an alternative embodiment of the method for plugging a permeable zone or a leak in a subterranean formation, the solution of borozirconate or borotitanate complex and the cross-linkable organic polymer are introduced separately, either simultaneously or sequentially, into the permeable zone or the site of the subterranean leak such that cross-linking occurs within the subterranean formation. This method comprises (a) preparing a base gel by mixing a cross-linkable organic polymer with an aqueous liquid; (b) introducing the base gel into the into the permeable zone or the site of the subterranean leak, (d) simultaneously with, or sequentially after, introducing the base gel into the into the permeable zone or the site of the subterranean leak, introducing the solution of borozirconate or borotitanate complex into the permeable zone or the site of the subterranean leak; (e) permitting the base gel and the cross-linker to react to form a cross-linked aqueous gel to plug the zone and/or leak. The solid or solution of borozirconate or borotitanate complex, the base gel, or both may further comprise a pH buffer.

The relative amounts of cross-linkable organic polymer and the borozirconate or borotitanate complex may vary. One uses small but effective amounts which for both will vary with the conditions, e.g., the type of subterranean formation, the depth at which the method (e.g., fluid fracturing, permeable zone plugging or leak plugging) is to be performed, temperature, pH, etc. Generally one uses as small an amount of each component as will provide the viscosity level necessary to effect the desired result, i.e., fracturing of the subterranean formation, or plugging permeable zones or leaks to the extent necessary to promote adequate recovery of oil or gas from the formation.

For example, satisfactory gels can generally be made for fluid fracturing by using the cross-linkable organic polymer in amounts up to about 1.2 weight % and the cross-linking composition in amounts up to about 0.50 weight % of the borozirconate complex, with percentages being based on the total weight of the base gel. Preferably, from about 0.25 to about 0.75 weight % of the cross-linkable organic polymer is used and from about 0.05 to about 0.25 weight % of the borozirconate complex is used.

In a method for plugging permeable zones or leaks, generally about 0.25 to 1.2 weight % of a cross-linkable organic polymer is used, preferably 0.40 borozirconate complex is used, preferably 0.05 to 0.25 weight %, based on the total weight of the base gel.

The amount of borozirconate complex used to cross-link the organic polymer is that which provides a zirconium or titanium ion concentration in a range from about 0.0005 weight % to about 0.1 weight %, based on the total weight of the base gel. The preferred concentration of zirconium or titanium ion is in the range of from about 0.001-0.05 weight %, based on the total weight.

Typically the borozirconate or borotitanate complex of this invention can be used at a pH of from about 6 to 11. For low temperature applications (150-250° F., 66-121° C.), a pH for the cross-linking composition of about 6 to about 8 is preferred. For moderate or high temperature applications (250-400° F., 121-204° C.), a pH of about 9 to about 11 is preferred. Advantageously, the solution of borozirconate or borotitanate complex of this invention is used at a temperature of 250-300° F. (121-149° C.).

The borozirconate complexes prepared as described herein are preferably used at higher temperatures (250-300° F., 121-149° C.) or pH 10 or greater with carboxymethylhydroxypropylguar. The borotitanate complexes prepared as described herein are preferably used at lower temperatures (150-250° F., 66-121° C.) with hydroxypropylguar.

EXAMPLES

In order to illustrate the suitability of the discrete borozirconate complexes and borotitanate complexes of this invention for use in hydraulic fracturing processes, their ability to crosslink modified guar gels was examined using a Fann 50C viscometer under the standard conditions described below.

The base gels were prepared as follows:

50 lb (6 kg) Hydroxypropylguar (HPG) Gel.

A base gel was prepared by adding 50 pounds of hydroxypropylguar (HPG) to 1000 gallons (6 kg of HPG to 1000 liters) of 2% aqueous potassium chloride solution to which had been added 10 pounds (4.5 kg) of sodium thiosulphate as well as a standard buffer system designed to give a gel pH of 8.4-8.5.

60 lb (7 kg) Carboxymethylhydroxypropylguar (CMHPG) Gel.

A base gel was prepared by adding 60 pounds of carboxymethylhydroxypropylguar (CMHPG) to 1000 gallons (7 kg of CMHPG to 1000 liters) of a 2% aqueous potassium chloride solution to which had been added 30 pounds (14 kg) of sodium thiosulphate as well as a standard buffer system designed to give a gel pH of 9.7-10.1.

Evaluation of Borozirconates and Borotitanates as Crosslinkers of Modified Guar Gels A Fann 50C viscometer was used to measure the instantaneous viscosity in centipoise (Cp) as a function of time for the modified guar as crosslinking by the discrete borozirconate or borotitanate complexes of the present invention proceeded. The handling of the modified guar base gel and introduction of the cross-linker was carried out as follows:

To a 1500-mL glass beaker into which the input and output hoses of a ½ H. P. Jabsco pump were inserted was added 750 mL of a prepared base gel solution. The gel solution was then circulated through the pump at full throttle. Immediately after initiating the fluid circulation, the crosslinker sample was added to the fluid stream. The solid crosslinkers were added directly to the beaker. The gel/crosslinker mixtures were circulated through the pump for a total of 2 minutes. Once fluid circulation had stopped, a 25-mL aliquot of the gel solution was withdrawn and immediately added to the Fann cup of the Fann 50C viscometer. The cup was rapidly attached to the viscometer and the shear stress vs. time profile at constant shear rate and temperature was recorded using a modified R1B1 bob.

The preparations of the compositions in the Examples were each carried out in closed vessels containing an agitator, thermometer, condenser, nitrogen inlet and dropping funnel. Unless specified otherwise, percentages are given by weight. Temperatures are given in degrees Celsius. The cross-linking properties of the compositions of this invention are given in the Examples as a function of the viscosity of carboxymethyl, hydroxypropylguar cross-linked with the borozirconate or borotitanate complexes of this invention.

Example 1

To a nitrogen purged 500-mL, 5-neck, round bottom flask that had been fitted with an overhead stirrer was added a solution of tetra-N-propylzirconate in n-propanol (129.92 g, 0.285 moles Zr). With rapid agitation, triethanolamine (84.92 g, 0.569 mole) was then added to the tetra-N-propylzirconate solution over a 5-minute period. The reaction mass was then heated with continued agitation at 60° C.±2° C. for 2 hours and then cooled to 40° C. Solid boric acid (17.62 g, 0.285 mole) was then added to the stirred reaction mass, which was then heated at 60° C.±2° C. for an additional 2.5 hours to give a light yellow solution which slowly deposited a small quantity of white crystalline material as it cooled to room temperature. Volatile reaction mass components were removed using reduced pressure (5 mm Hg, 700 Pa, 60° C., 3 hours). A white, crystalline solid (118.87 g) remained. Analysis showed % Zr was 19.14. Molar ratio of Zr:triethanolamine:boric acid was 1:2:1.

Example 2

To a nitrogen purged 500-mL, 5-neck, round bottom flask that had been fitted with an overhead stirrer was added a solution of tetra-N-propylzirconate in n-propanol (130.24 g, 0.286 moles Zr). With rapid agitation, triethanolamine 85.32 g, 0.572 mole) was then added to the tetra-N-propylzirconate solution over a 5-minute period. The reaction mass was then heated with continued agitation at 60° C.±2° C. for 2 hours and then cooled to 45° C. Solid boric acid (35.38 g, 0.572 mole) was then added to the stirred reaction mass, which was then heated at 60° C.±2° C. for an additional 2.5 hours to give a light yellow solution which remained homogeneous upon cooling to room temperature. Volatile reaction mass components were removed using reduced pressure (5 mm Hg, 700 Pa, 60° C., 5 hours). A white, crystalline solid (133.28 g) remained. Analysis showed % Zr was 18.28. Molar ratio of Zr:triethanolamine:boric acid was 1:2:2.

Example 3

To a nitrogen purged 500-mL, 5-neck, round bottom flask that had been fitted with an overhead stirrer was added a solution of tetra-N-propylzirconate in n-propanol (130.17 g, 0.287 moles Zr). With rapid agitation, triethanolamine (42.85 g, 0.287 mole) was then added to the tetra-N-propylzirconate solution over a 5-minute period. The reaction mass was then heated with continued agitation at 60° C.±2° C. for 2 hours and then cooled to 35° C. Solid boric acid (17.75 g, 0.287 mole) was then added the stirred reaction mass, which was then heated at 60° C.±2° C. for an additional 2.5 hours to give a light yellow solution which remained homogeneous upon cooling to room temperature. Volatile reaction mass components were removed using reduced pressure (5 mm Hg, 700 Pa, 60° C., 4 hours). A white, crystalline solid (77.63 g) remained. Analysis showed % Zr was 26.02. Molar ratio of Zr:triethanolamine:boric acid was 1:1:1.

Example 4

To a nitrogen purged 500-mL, 5-neck, round bottom flask that had been fitted with an overhead stirrer was added tetraisopropyltitanate (100.02 g, 0.352 moles). With rapid agitation, triethanolamine (105.04 g, 0.704 mole) was then added to the tetraisopropyltitanate over a 40-minute period while keeping the reaction mass temperature at less than 45° C. The reaction mass was then heated with continued agitation at 60° C.±2° C. for 2 hours and then cooled to 45° C. Solid boric acid (21.78 g, 0.352 mole) was then added to the stirred reaction mass, which was then heated at 80° C.±2° C. for an additional 2.5 hours to give a light yellow homogeneous slurry which became thicker upon cooling to room temperature. Volatile reaction mass components were removed using reduced pressure (5 mm Hg, 700 Pa, 65° C., 5.5 hours). A white, crystalline solid (77.63 g) remained. Analysis showed % Zr was 26.02. Volatile reaction mass components were removed using reduced pressure (5 mm Hg, 700 Pa, 65° C., 5.5 hours). A pale yellow, crystalline solid (121.80 g) remained. Analyzed for % Ti: 12.48. Molar ratio of Ti:triethanolamine:boric acid was 1:2:1.

Example 5

To a nitrogen purged 500-mL, 5-neck, round bottom flask that had been fitted with an overhead stirrer was added a solution of tetra-N-propylzirconate in n-propanol (79.92 g, 0.176 moles Zr). With rapid agitation, triisopropylborate (33.08 g, 0.176 mole) was then added to the tetra-N-propylzirconate solution over a 5-minute period. The reaction mass was then heated with continued agitation at 60° C.±2° C. for 1 hour and then cooled to 25° C. Triethanolamine (52.50 g, 0.352 mole) was then added to the reaction mass over a 5-minute period. The reaction mass was then heated at 60° C.±2° C. for an additional 2 hours to give a light yellow, homogeneous slurry. Volatile reaction mass components were removed using reduced pressure (5 mm Hg, 700 Pa, 70° C., 6 hours). A white, crystalline solid (68.81 g) remained. Analyzed for % Zr: 20.35. Molar ratio of Zr:triethanolamine:boric acid was 1:2:1.

Example 6

To a nitrogen purged 500-mL, 5-neck, round bottom flask that had been fitted with an overhead stirrer was added a solution of tetra-N-propylzirconate in n-propanol (177.9 g, 0.40 moles Zr). With rapid agitation, L-699 amine (L-699 amine is hydroxyethyl trishydroxyisopropyl ethylenediamine, 55.6 g, 0.20 mole) was then added to the tetra-N-propylzirconate solution over a 1-hour period. The reaction mass was then heated with continued agitation to 60° C.±2° C. for 1 hour and then cooled to room temperature. Solid boric acid (24.8 g, 0.40 mole) was then added to the stirred reaction mass, which was then heated to reflux for an additional 2 hours to give a light yellow homogeneous solution which remained homogeneous upon cooling to room temperature. Volatile reaction mass components were removed using reduced pressure (5 mm Hg, 700 Pa, 70° C., 3 hours). A powdery, white, crystalline solid (129.8 g) remained. Analyzed for % Zr: 27.15. Molar ratio of Zr:triethanolamine:boric acid was 2:1:2.

Example 7

To a nitrogen purged 500-mL, 5-neck, round bottom flask that had been fitted with an overhead stirrer was added a solution of tetra-N-propylzirconate in n-propanol (177.9 g, 0.40 moles Zr). With rapid agitation, QUADROL polyol (tetrahydroxyisopropyl ethylenediamine, available from BASF Corporation, Mount Olive, N.J., 116.8 g, 0.40 mole) was then added to the tetra-N-propylzirconate solution over a 2-hour period. The reaction mass was then heated with continued agitation to 60° C.±2° C. for 1 hour and then cooled to 45° C. Solid boric acid (24.8 g, 0.40 mole) was then added to the stirred reaction mass, which was then heated to reflux for an additional 2 hours to give a light yellow, homogeneous solution. Approximately ½ of the solution was set aside for later use (131.0 g). Volatile reaction mass components were removed using reduced pressure (5 mm Hg, 700 Pa, 69° C., 3 hours). A powdery, white, crystalline solid (100.3 g)

remained. Analyzed for % Zr: 17.96. This white solid remained, which was evaluated as EXAMPLE 7. Molar ratio of Zr:triethanolamine:boric acid was 1:1:1.

Example 8

To a nitrogen purged 500-mL, 5-neck, round bottom flask that had been fitted with an overhead stirrer was added tetraisopropyltitanate (71.0 g, 0.25 moles). With rapid agitation, triethanolamine (74.5 g, 0.50 mole) was then added to the tetraisopropyltitanate over a ½-hour period while keeping the reaction mass temperature at less than 45° C. The reaction mass was then heated with continued agitation at 60° C.±2° C. for 2 hours and then cooled to 55° C. A solution of boric acid (31.0 g, 0.50 moles) in methanol (100.0 g) was then added over a ½-hour period to the stirred reaction mass, which was then heated at reflux for an additional 1 hour to give a light yellow, homogeneous solution. Volatile reaction mass components were removed using reduced pressure (5 mm Hg, 700 Pa, 65° C., 4.5 hours). A white, crystalline solid (110 g) remained, which was used in the evaluation as EXAMPLE 8. Analyzed for % Ti: 11.90. Molar ratio of Ti:triethanolamine:boric acid was 1:2:2.

Example 9

To a nitrogen purged 500-mL, 5-neck, round bottom flask that had been fitted with an overhead stirrer was added a solution of tetra-N-propylzirconate in n-propanol (177.9 g, 0.40 moles Zr). With rapid agitation, triethanolamine (59.6 g, 0.40 mole) was then added to the tetra-N-propylzirconate solution over a ½-hour period. The reaction mass was then heated with continued agitation to 60° C.±2° C. for 1 hour and then cooled to 55° C. A solution of boric acid (12.4 g, 0.20 moles) in methanol (75 mL) was then added over a ½-hour period to the stirred reaction mass, which was then heated at reflux for an additional 1 hour to give a yellow, homogeneous solution. Volatile reaction mass components were removed using reduced pressure (5 mm Hg, 700 Pa, 69° C., 4 hours). A white, crystalline solid (68.8 g) remained, which was evaluated as EXAMPLE 9. Analyzed for % Zr: 29.73. Molar ratio of Zr:triethanolamine:boric acid was 2:2:1.

Example 10

To a nitrogen purged 500-mL, 5-neck, round bottom flask that had been fitted with an overhead stirrer was added a solution of tetra-N-propylzirconate in n-propanol (177.9 g, 0.40 moles Zr). With rapid agitation, triethanolamine (59.6 g, 0.40 mole) was then added to the tetra-N-propylzirconate solution over a ½-hour period. The reaction mass was then heated with continued agitation to 60° C.±2° C. for 1 hour and then cooled to 58° C. A solution of boric acid (8.27 g, 0.13 moles) in methanol (50 mL) was then added over a ½-hour period to the stirred reaction mass, which was then heated at reflux for an additional 1 hour to give a yellow, homogeneous solution. Volatile reaction mass components were removed using reduced pressure (5 mm Hg, 700 Pa, 67° C., 3 hours). A white, crystalline solid (123.8 g) remained, which was evaluated as EXAMPLE 10. Analyzed for % Zr: 31.10. Molar ratio of Zr:triethanolamine:boric acid was 3:3:1.

Example 11

To a nitrogen purged 500-mL, 5-neck, round bottom flask that had been fitted with an overhead stirrer was added a solution of tetra-n-propyl zirconate in n-propanol (80.13 g, 0.172 mole Zr). With rapid agitation, triethanolamine (51.46 g, 0.345 mole) was then added to the tetra-n-propyl zirconate over a 5-minute period. The reaction mass was then heated with continued agitation at 60° C.±2° C. for 1 hour and then cooled to 45° C. Triisopropyl borate (32.31 g, 0.172 mole) was then added to the reaction mass over a 5-minute period to give a pale yellow, homogeneous slurry which was then heated with continued agitation at 60° C.±2° C. for an additional 2 hours. Volatile reaction mass components were removed using reduced pressure (5 mm Hg, 700 Pa, 65° C., 5 hours). A white, granular solid (72.81 g) remained. Analyzed for % Zr: 20.46. Molar ratio of Zr:triethanolamine:boric acid was 1:2:1.

TABLE 1

Borotitanate Performance with 50 lb/1000 gal HPG base gel containing 2% KCl at pH 8.4-8.5.

| Example | % Ti | TPT, mg | TPT, moles | TEA, moles | BA, moles | Rate, min. | Max Visc. (Cp) | Visc. at 30 min. (Cp) | Visc. at 60 min. (Cp) |
|---|---|---|---|---|---|---|---|---|---|
| 4 | 12.48 | 321 | 1 | 2 | 1 | 3 | 294 | 155 | 129 |
| 8 | 11.90 | 336 | 1 | 2 | 2 | 4 | 262 | 144 | 119 |

TABLE 2

Borozirconate Performance with 60 lb/1000 gal CMHPG base gel containing 2% KCl at pH 9.7-10.

| Example | % Zr | Zr, mg | NPZ, moles | Alkanolamine (moles) | Borate, (moles) | Rate, min. | Max Visc. (Cp) | Visc. at 30 min. (Cp) | Visc. at 60 min. (Cp) |
|---|---|---|---|---|---|---|---|---|---|
| 1 | 19.14 | 104 | 1 | TEA (2) | BA (1) | 3 | 413 | 276 | 211 |
| 2 | 18.28 | 109 | 1 | TEA (2) | BA (2) | 3 | 459 | 283 | 237 |
| 3 | 26.02 | 77 | 1 | TEA (1) | BA (1) | 3 | 463 | 318 | 273 |
| 5 | 20.35 | 98 | 1 | TEA (2) | TIPB (1) | 3 | 495 | 335 | 279 |
| 6 | 27.15 | 74 | 2 | L-699 (1) | BA (2) | 3 | 291 | 186 | 159 |
| 7 | 17.96 | 111 | 1 | QUADROL (1) | BA (1) | 3 | 438 | 208 | 157 |
| 9 | 29.73 | 67 | 2 | TEA (2) | BA (1) | 3 | 378 | 282 | 252 |
| 10 | 31.10 | 64 | 1 | TEA (1) | BA (0.33) | 4 | 294 | 202 | 174 |
| 11 | 20.46 | 98 | 1 | TEA (2) | TIPB (1) | 3 | 427 | 290 | 251 |

Tables 1 and 2 show the performance of the crosslinkers prepared according to the Examples 1-11, using borotitanate or borozirconate amounts equivalent to 40 mg Ti or 20 mg Zr, respectively, with base gels; prepared using hydroxypropylguar (HPG) or carboxymethylhydroxypropylguar (CM-HPG), as described hereinabove. Measurements were made at 250° F. at 176 sec-1 shear rate.

As abbreviations, TPT refers to tetraisopropyl titanate; TEA refers to triethanolamine; BA refers to boric acid; TIPB refers to triisopropylborate, NPZ refers to n-propyl zirconate, L-699 is hydroxyethyl trishydroxyisopropyl ethylenediamine.

In these Tables, "Rate, min." means the cross-linking time or rate, in minutes, it takes to reach maximum viscosity in the Fann viscometer. The viscosity at this maximum time is labeled "Max Visc. (Cp)" to indicate the viscosity in centipoise. The viscosity after 30 and 60 minutes at the test temperature is labeled "Visc. at 30 min. (Cp)" and "Visc. at 60 min. (Cp)", respectively, to indicate viscosity in centipoise after 30 and 60 minutes at the test temperature.

The data in Table 1 clearly show that the viscosity of the tested base gels crosslinked with the borotitanate complexes of the present invention reach a maximum somewhere between 3 and 5 minutes demonstrating the required delayed crosslinking performance. In addition, the viscosity of the crosslinked gels is slow to decline, and is maintained above the level necessary (100 Cp) over the time required to successfully complete the fracturing operation.

The data in Table 2 clearly show that the viscosity of the tested base gels crosslinked with the borozirconate complexes of the present invention reach a maximum somewhere between 3 and 5 minutes demonstrating the required delayed crosslinking performance. In addition, the viscosity of the crosslinked gels is slow to decline, and is maintained above the level necessary (100 Cp) over the time required to successfully complete the fracturing operation. The data also shows that the borozirconate-based cross-linkers generate higher initial viscosity and retain a higher viscosity, which allows them to be used in higher temperature wells.

What is claimed is:

1. A process for preparing a solid complex suitable for cross-linking a fracturing fluid which comprises: (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker.

2. The process of claim 1 wherein when the metal is zirconium, the metal complex is a tetraalkyl zirconate, selected from the group consisting of tetra-isopropyl zirconate, tetra-n-propyl zirconate, and tetra-n-butyl zirconate; and when the metal is titanium, the metal complex is a tetraalkyl titanate, selected from the group consisting of tetra-isopropyl titanate, tetra-n-propyl titanate, and tetra-n-butyl titanate.

3. The process of claim 2 wherein the alkanolamine is selected from the group consisting of triethanolamine, tri-n-propanolamine, tri-isopropanolamine, tetrahydroxyisopropyl ethylenediamine and hydroxyethyl trishydroxyisopropyl ethylenediamine.

4. The process of claim 3 wherein the mole ratio of alkanolamine to zirconium or titanium is from 1 to 2 moles of alkanolamine per mole of zirconium or titanium.

5. The process of claim 4 wherein a diluent is added to the product of step (c) or to the solid after step (d).

6. The process of claim 5 wherein the diluent is potassium chloride or tetramethylammonium hydroxide, and is added to the product of step (c) prior to step (d).

7. The process of claim 5 wherein the diluent is titanium dioxide or silicon dioxide, and is added to the solid after step (d).

8. The process of claim 3 wherein the boron compound is boric acid or a trialkyl borate.

9. The process of claim 2 wherein the alkanolamine is a trialkanolamine, hydroxyalkylene diamine, or mixtures thereof.

10. A cross-linking composition which comprises: (A) an aqueous liquid; (B) a pH buffer; (C) a cross-linkable organic polymer; and (D) a solid borozirconate or borotitanate complex, prepared according to a process comprising (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker.

11. The cross-linking composition of claim 10 wherein the cross-linkable organic polymer is a solvatable polysaccharide and is selected from the group consisting of gums, gum derivatives and cellulose derivatives.

12. The cross-linking composition of claim 11 wherein the cross-linkable organic polymer is selected from the group consisting of guar derivatives and cellulose derivatives.

13. The cross-linking composition of claim 10 wherein the aqueous liquid is selected from the group consisting of water, aqueous alcohol, and aqueous solution of a clay stabilizer.

14. A method for hydraulically fracturing a subterranean formation, which comprises introducing into the formation at a flow rate and pressure sufficient to create, reopen, and/or extend one or more fractures in the formation, a cross-linking composition comprising: (A) an aqueous liquid; (B) a pH buffer; (C) a cross-linkable organic polymer; and (D) a solid borozirconate or borotitanate complex, prepared by a process comprising: (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker.

15. The method of claim 14 wherein the aqueous liquid, the buffer, the cross-linkable organic polymer and the solid borozirconate or borotitanate complex are contacted prior to their introduction into the formation.

16. The method of claim 14 further comprising dissolving the solid borozirconate or borotitanate complex in a solvent to produce a solution prior to introducing into the formation.

17. The method of claim 14 wherein the formation is penetrated by a wellbore and comprises (1) preparing a base gel by mixing a cross-linkable organic polymer with an aqueous liquid; (2) introducing the base gel into the wellbore; (3) simultaneously with, or sequentially after, introducing the base gel into the wellbore, introducing a solution of a solid borozirconate or borotitanate complex wherein the solution is prepared by a process comprising: (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; (d) removing the volatiles from the product of step (c) to form a solid borometalate cross-linker and (e) dissolving the solid borozirconate or borotitanate complex in water; (4) permitting the base gel and the solution of borozirconate or borotitanate complex to react to form a cross-linked aqueous gel; and (5) introducing the cross-linked gel into the formation from the wellbore at a flow rate and pressure sufficient to create, reopen, and/or extend a fracture in the formation, wherein a pH buffer is independently admixed with the base gel, the solution of borozirconate or borotitanate complex, or both, prior to introducing the base gel and the borozirconate or borotitanate solution into the wellbore.

18. The method of claim 14 further comprising introducing proppant into the subterranean formation.

19. A method for selectively plugging permeable zones and leaks in subterranean formations which comprises introducing into the permeable zone or the site of the subterranean leak, a cross-linking composition comprising (A) an aqueous liquid; (B) a pH buffer; (C) a cross-linkable organic polymer; and D) a solid borozirconate or borotitanate complex prepared by a process comprising (a) contacting a metal complex, wherein the metal is zirconium or titanium, with alkanolamine at a mole ratio of 0.8 to 2.2 moles of alkanolamine per mole of metal in an alcohol solvent to form a first mixture; (b) contacting the first mixture with a boron compound at a mole ratio of about 0.25 to 3 moles of boron per mole of metal to produce a second mixture; (c) maintaining the second mixture for a sufficient period of time for the reaction to reach equilibrium; and (d) removing the volatiles from the product of step (c) to form a solid borometalate cross-linker.

20. The method of claim 19 further comprising contacting the solid borozirconate or borotitanate complex with water or solvent to produce a solution prior to introducing into the formation.

21. The method of claim 19 wherein the aqueous liquid, pH buffer, cross-linkable organic polymer and the solid or solution of borozirconate or borotitanate complex are contacted prior to their introduction into the subterranean formation, such that the polymer and borozirconate or borotitanate complex react to form a cross-linked aqueous gel, which gel is then introduced into the formation.

* * * * *